United States Patent [19]
Williams

[11] Patent Number: 5,808,732
[45] Date of Patent: Sep. 15, 1998

[54] SYSTEM FOR REFERENCING A DIRECTION OF AN OUTPUT BEAM

[75] Inventor: Samuel George Llewelyn Williams, Cupertino, Calif.

[73] Assignee: Lockheed Martin Corporation, Bethesda, Md.

[21] Appl. No.: 773,622

[22] Filed: Dec. 20, 1996

[51] Int. Cl.[6] .................................................. H04J 14/08
[52] U.S. Cl. ..................................... 356/139.01; 244/171
[58] Field of Search ....................... 356/139.01, 139.03, 356/141.5; 244/171

[56] References Cited

U.S. PATENT DOCUMENTS

| | | | |
|---|---|---|---|
| H712 | 11/1989 | Hartman | 364/456 |
| 4,679,753 | 7/1987 | Landecker | 244/171 |
| 4,790,641 | 12/1988 | Halldorsson | 350/537 |
| 4,977,560 | 12/1990 | Wantuck | 372/2 |
| 5,052,801 | 10/1991 | Downes, Jr. et al. | 356/153 |
| 5,189,295 | 2/1993 | Falbel | 250/206.2 |
| 5,204,818 | 4/1993 | Landecker et al. | 364/459 |
| 5,348,255 | 9/1994 | Abreu | 244/171 |
| 5,546,087 | 8/1996 | Neira | 342/120 |

*Primary Examiner*—Mark Hellner
*Attorney, Agent, or Firm*—Terry McHugh; Leo B. Wegemer

[57] ABSTRACT

A system for precisely determining directionality of an output beam includes a beam source and a body position identifier facing opposite directions, with a grating rhomb positioned to provide an attenuated sample beam from the beam source into the oppositely directed body positioned identifier. In the preferred embodiment, the beam source is a pulsed laser source and the body position identifier is a star tracker for forming a stellar map. The grating rhomb includes first and second grating members. The first grating member extends across the optical path of the output beam and has a geometry to diffract a minor portion of the output beam intensity while passing a major portion of the output beam for continued propagation in a first direction. The second grating member is positioned to traverse the field of view of the body position identifier. In the preferred embodiment, the first grating member traverses the optical axis of the output beam and the second grating member is at the intersection of the optical axis of the body position identifier and the optical axis of the diffracted sample beam from the first grating member. The system also includes an auto-collimator that is used to monitor the orientation of the two grating members. When used in a space application, the system also includes a Global Positioning System receiver.

18 Claims, 4 Drawing Sheets

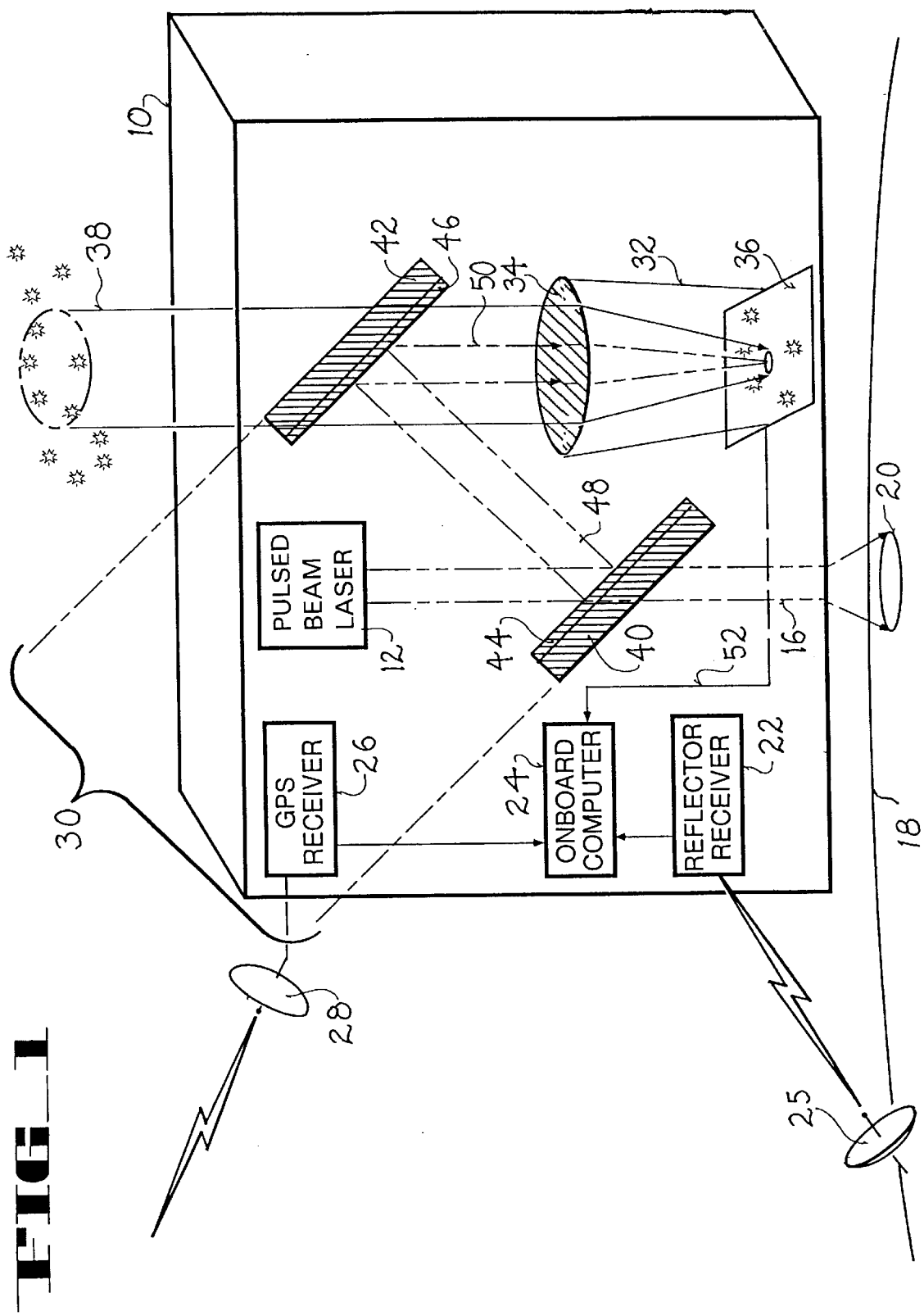
FIG_1

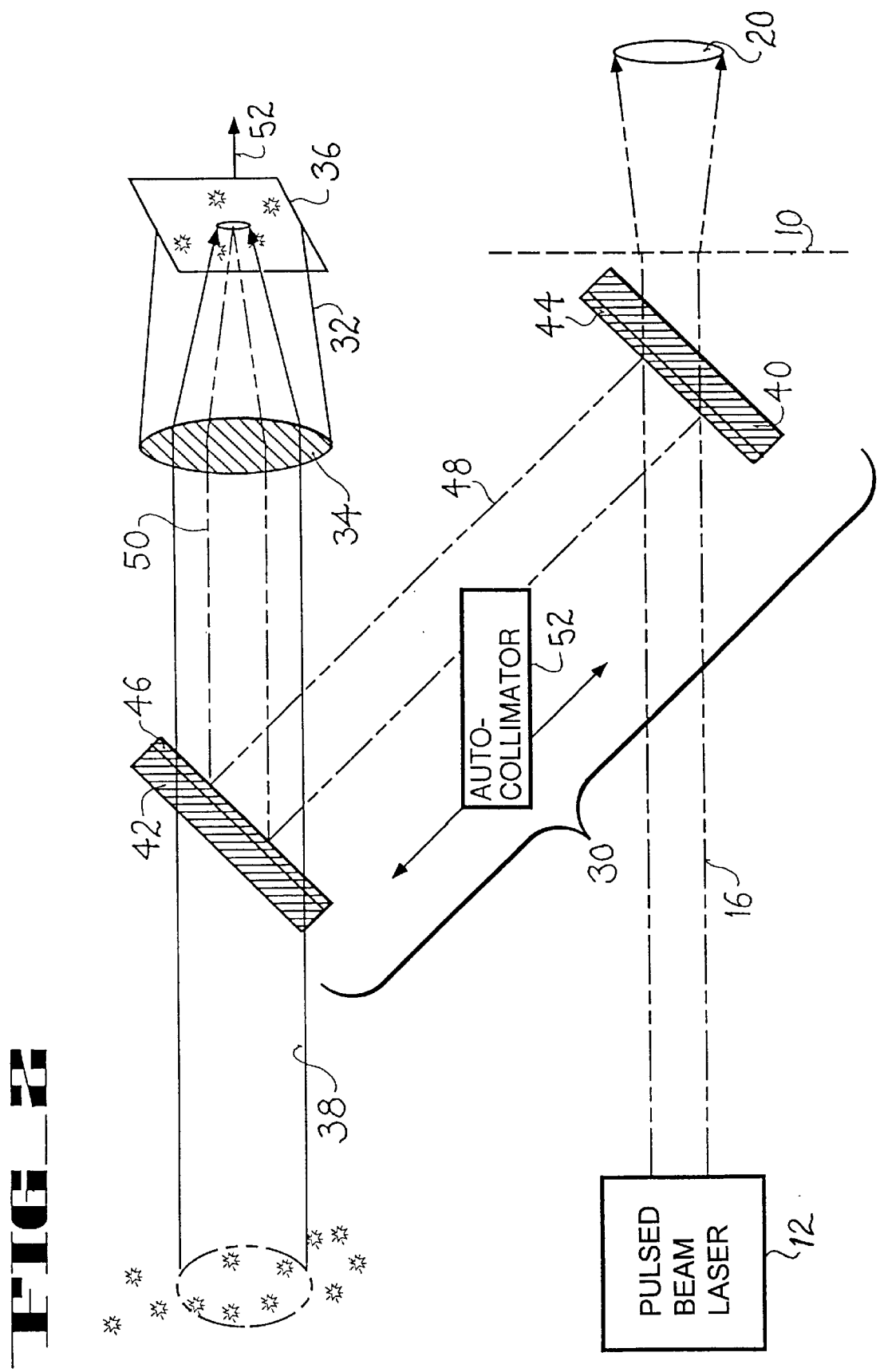
FIG_2

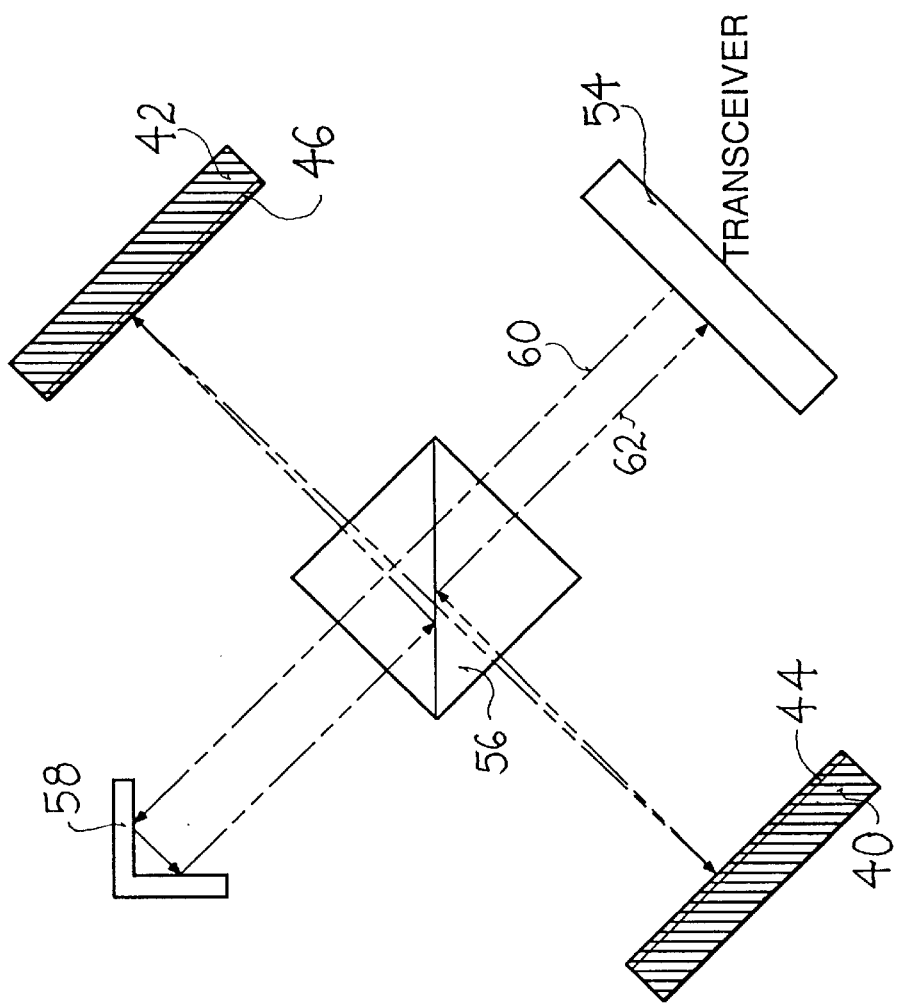
FIG_3

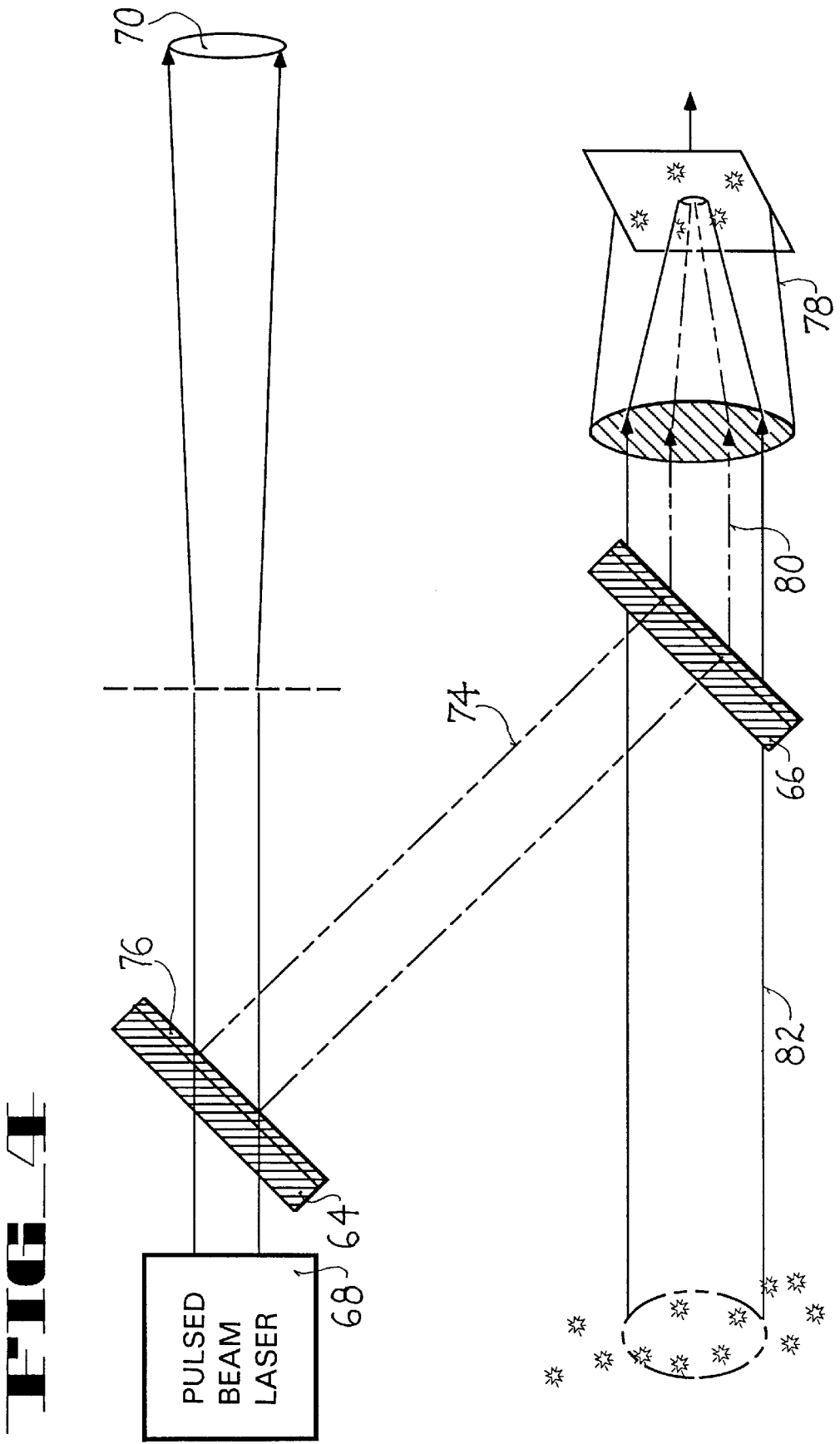

SYSTEM FOR REFERENCING A DIRECTION OF AN OUTPUT BEAM

TECHNICAL FIELD

The invention relates generally to systems for precisely determining the direction of an output beam and more particularly to systems for referencing the direction of a laser beam to inertial space.

BACKGROUND ART

Many systems require precise knowledge of the direction of an output beam in order to produce reliable and accurate results during performance of a system operation. For example, a system may require a laser to form openings through a surface during a fabrication step for manufacturing a device. A high manufacturing throughput is achievable only if the laser-formed openings are precisely located along the surface. In another application, an output beam may not perform any work, but may instead be used to ensure proper alignment of one member or device relative to another member or device. As a third example, an output beam may be projected from a spacecraft, such as a satellite, in order to acquire data or to transmit acquired data. In this third example, precise knowledge of beam direction is important, since the distance between the satellite and an intended target area may cause a minor beam angle miscalculation to have a significant adverse effect on system performance.

One application in which an output beam is projected from a satellite to the earth is ocean and polar-cap altimetry. Monitoring changes in the thickness of ice in Greenland and/or Antarctica provides data that can be used to analyze and predict climatic patterns for the earth. The output beam may be in the form of infrared laser pulses that create a footprint that is in the range of 50 meters to 100 meters. The time required for photons to reach the earth's surface and reflect to a receiver is used to determine the distance between the spacecraft and the earth. The height of the spacecraft relative to the center of the earth may be determined in some other manner, e.g., using Global Positioning System (GPS) techniques. The height of the ice or ocean is the difference between the distance from the spacecraft to the earth's surface and the distance from the spacecraft to the earth's center. Consequently, accurate altimetry calculations will be obtained only if the output beam is directed at the earth's center, i.e., nadir-directed.

One technique for accurately directing a laser beam from a spacecraft is to utilize a star tracker. A star tracker images an area of the sky to provide positional reference data to attitude computational circuitry within the spacecraft. Star trackers are described in U.S. Pat. Nos. 5,348,255 to Abreu, 4,790,641 to Halldorsson and 4,187,422 to Zoltan. The Halldorsson patent describes use of a star tracker with a space telescope. The star tracker includes an optical arrangement and a position-sensitive detector, such as a charge coupled device (CCD). The optical arrangement directs optical signals (i.e., light from stars and other celestial bodies) onto the CCD array, which is positioned on a focal plane of the optical arrangement. The optical signals having sufficient brightness are imaged in a scanning operation to form a stellar map. The invention of Halldorsson is to direct the observation telescope toward a known reference star that is detected by the star tracker, with both the telescope and the star tracker facing in the same direction. The image of the reference star which is created in the focal plane of the observation telescope is channeled to a collimator that is rigidly arranged in the object-side opening of the star tracker optical arrangement. The coordinates of the images formed by the observation telescope and the star tracker are compared to determine the angular deviations between the optical axes of the observation telescope and the star tracker. A prism system is used at the collimator to reflect the light at the collimator into the beam path of the star tracker. While the Halldorsson invention relates to a telescope and a star tracker that face in the same direction, some of the techniques may be used in the application described above with reference to directing laser pulses to the earth's surface and using the star tracker to provide the necessary positional reference data. For example, a pair of extended corner cubes may be used to direct a small portion of the laser beam into the star tracker. A concern is that this approach is cumbersome and the calculations of beam direction may vary with beam focus.

The data related to the attitude of the spacecraft and the data related to the direction of the output beam are combined to determine the precise location of the footprint of laser energy that reaches the earth's surface. Prior art techniques function well for their intended purpose. However, greater reliability is desired. If the laser beam is not properly focused, many known beam referencing techniques may reach inaccurate calculations.

What is needed is a system for precisely determining a direction of a beam without susceptibility to inaccuracies caused by beam defocusing. What is further needed is such a system that accomplishes the precise determination without requiring excessive area or mass, thereby accommodating use of the system within a spacecraft.

SUMMARY OF THE INVENTION

A system for precisely determining directionality of a beam includes a beam source positioned to direct an output beam in a first direction and includes a body position identifier having a fixed optical line of sight in a second direction substantially opposite to the first direction. That is, the beam source and the body position identifier face in opposite directions. The body position identifier includes a detector that is responsive to optical signals within its field of view. In the preferred embodiment, the beam source is a source of laser pulses directed toward the earth's surface from a spacecraft, while the body position identifier is a star tracker for forming a stellar map.

A first grating member extends across the optical path of the output beam and has a geometry to diffract a minor portion of the output beam intensity while passing a major portion of the output beam intensity for continued propagation in the first direction. That is, the first grating member has a low diffraction efficiency.

A second grating member is positioned to traverse the field of view of the body position identifier, i.e., the star tracker in the preferred embodiment. The second grating member is generally transparent to incoming light from celestial bodies, allowing the star tracker to perform its intended imaging function. The output beam intensity diffracted by the first grating member forms a sample beam that is directed at the second grating member. The second grating member has a geometry to diffract a portion of the sample beam intensity into the field of view of the star tracker. In the preferred embodiment, the second grating member also has a low diffraction efficiency, so that the star tracker receives a substantially attenuated sample beam. Also in this preferred embodiment, the centroid of the attenuated sample beam represents the centroid of the output beam from the beam source. That is, the true centroid of the output beam direction is measured directly in star space. This is accomplished by placing the first grating member to traverse the optical axis of the output beam and placing the second grating member at the intersection of the optical axis of the star tracker and the optical axis of the diffracted sample beam from the first grating member. In the preferred embodiment, the first and second grating members define a grating rhomb.

The system includes a reflection grating embodiment and a transmission grating embodiment. In the reflection grating embodiment, the two grating members are positioned such that the diffracted sample beam energy is reflected energy. In the transmission grating embodiment, the sample beam energy is energy that is diffracted upon transmission through the arrays of gratings.

The system includes a capability of determining the position of the beam source relative to earth. In the preferred embodiment, this capability is achieved using Global Positioning System (GPS) techniques. The system includes a GPS receiver that provides inputs to an on-board computer that calculates the position based upon known geometric principles of triangulation.

The preferred embodiment also includes an auto-collimator that is used to monitor the orientation of the two grating members relative to each other. In the preferred embodiment in which the grating members form a grating rhomb, the two grating members have parallel grating surfaces. However, thermal changes within the spacecraft and forces that are exerted during a launch may cause some changes in the orientation of the two grating members. The auto-collimator determines whether the two grating members are in proper alignment. Any detected error in alignment may be offset in signal processing by the on-board computer. Alternatively, there may be a mechanical correction for properly aligning the two grating members.

An advantage of the invention is that the technique of providing a spatially offset sample beam that represents the true centroid of the laser output beam allows the determination of beam directionality to be executed in a manner that is not affected by beam focus. Another advantage is that the low diffraction efficiencies of the grating members of the grating rhomb introduce a sample beam to the star tracker or other body position identifier with a high degree of attenuation, e.g., attenuation by greater than six orders of magnitude. The attenuation that is achieved is in the range of 0.5 to $10^{-12}$, and is determined by the selection of the grating geometry. In a spacecraft application, the beam directionality is determined using equipment that is conventionally included in altimetry monitoring satellites, so that the additional equipment required in order to utilize the invention does not significantly tax the weight and volume constraints of the satellite. Another advantage in the use of the grating rhomb embodiment is that any instability in the wavelength of the output beam will not affect the ability of the two grating members to maintain the parallel relationship between the output beam and the attenuated sample beam.

BRIEF DESCRIPTION OF THE DRAWINGS

FIG. 1 is a schematical view of a spacecraft housing for containing a system for determining output beam directionality in accordance with one embodiment of the invention.

FIG. 2 is a schematical view of the system of FIG. 1.

FIG. 3 is a schematical view of an auto-collimator for monitoring the orientation of grating members of FIG. 2.

FIG. 4 is a schematical view of a second embodiment of a system for determining beam directionality in accordance with the invention.

BEST MODE FOR CARRYING OUT THE INVENTION

With reference to FIG. 1, a system for determining directionality of an output beam is illustrated in its preferred embodiment for use in the space industry. However, the system may be used in other applications, such as the use of a laser to form a precise array of openings in a surface to manufacture a component. In FIG. 1, the system is contained within a spacecraft housing 10. The spacecraft housing may be a satellite orbiting the earth with a mission of acquiring altimetry information of the ocean and/or icecaps for predicting climatic patterns.

Contained within the spacecraft housing 10 is a pulsed beam laser 12. The laser may be a diode-pumped Nd:YaG (neodymium-yttrium-garnet) device, but this is not critical. Such a device may be used to generate infrared laser pulses of 1.064 μm at an energy of 120 mJ. Doubler capability allows output of a visible green light of 0.532 μm and an energy of 60 mJ. The infrared pulses may be used for surface altimetry, while the green pulses may be used for atmospheric measurements by detection of backscattering from clouds. The pulse repetition rate may be 40 pulses per second.

After an output beam 16 exits the spacecraft housing 10, the beam will diverge as it approaches earth 18. The original beam diameter may be 1 cm, but may create a footprint 20 having a diameter of 70 meters. Photons that are reflected back to the spacecraft are detected by a reflection receiver 22. The reflection receiver typically includes a telescope. An electrical signal responsive to the reception of the photons is generated and output to an on-board computer 24. Distance measurements are determined based upon the round-trip pulse time for the received reflected energy. Optionally, the reflected energy may be received at other locations, such as ground stations or aircrafts. However, the preferred embodiment is one in which the computations are all performed aboard the spacecraft that houses the beam source 12. Results can then be transmitted to a receiver 25 using conventional satellite transmission techniques.

In order to acquire reliable and accurate information regarding ocean height, it is necessary to precisely determine the navigation of the spacecraft and the direction of the output beam 16. The location of the spacecraft relative to the center of the earth can be calculated using known GPS techniques. A GPS receiver 26 having an input from an antenna 28 provides signals to the on-board computer 24 to allow triangulation calculations. GPS technology is well known in the art.

The directionality of the beam 16 may be precisely determined using a grating rhomb 30 and a star tracker 32. The star tracker is a conventional device in the space industry. A star tracker images an area of the sky to provide positional reference data to attitude computation circuitry of the on-board computer 24. The star tracker includes an optical arrangement 34 and a position-sensitive detector 36. The optical arrangement includes a telescope having a field of view 38 in which the line of sight is directed opposite to the direction of the laser output beam 16. In FIG. 1, the field of view of the star tracker 13 is shown as imaging five celestial bodies, i.e., stars. While not critical, the field of view of the star tracker may be 10 degrees square. The position-sensitive detector 36 is shown schematically. The electronics may contain an image dissector tube and a CCD array. There may be 192 pixels in the x-direction (horizontal) and 165 pixels in the y-direction (vertical).

The field of view 38 of the star tracker 32 is scanned electronically. Images of stars are optical signals that will be present at specific pixels of the CCD array. The position-sensitive detector 36 outputs an indication of the intensity of the optical signal and the location in the x and and y coordinates. That is, the output of the star tracker 32 that is transmitted to the on-board computer 24 provides information regarding the intensity and the location of celestial bodies. The on-board computer may include inertial information for a sufficient number of stars to enable complete coverage of spacecraft position identification regardless of the orbital location of the spacecraft.

The grating rhomb 30 includes a first grating member 40 and a second grating member 42. The operation of the grating rhomb will be described with reference to FIGS. 1 and 2. Each of the grating members 40 and 42 has a low efficiency with respect to diffracting beam energy. Consequently, a major portion of the beam energy is transmitted through the first grating member 40 without being diverted from the optical axis that extends from the pulsed beam laser 12 to the footprint 20 on the earth 18. As is well known in the art, the detection efficiency is determined by the geometry of gratings on grating surfaces 44 and 46 of the members. If the grating at each grating surface has a pitch that is a minor wavelength relative to the wavelength of the light which forms the output beam 16, the diffraction efficiency will be low. In the preferred embodiment, the diffracted beam intensity is $10^{-3}$ of the incident beam intensity at each of the two grating members. Consequently, the laser beam intensity that reaches the star tracker 32 is attenuated by approximately $10^{-6}$ relative to the exit beam of the laser source 12. However, the exact attenuation is not critical to the invention. Depending upon the selection of grating geometry, attenuation within the range of 0.5 to $10^{-12}$ is contemplated. A grating rhomb assembly is described in U.S. Pat. No. 4,977,560 to Wantuck. The grating surface 44 may be formed in a dielectric overcoat on a transparent substrate. For example, the dielectric overcoat may be zinc fluoride or calcium fluoride on a glass substrate.

When the output beam 16 from the pulsed beam laser 12 reaches the grating on the surface 44 of the first grating member 40, a major portion of the flux density passes through the first grating member to the footprint 20 on the earth. A minor portion, e.g. $10^{-3}$, is diffracted and forms a sample beam that is directed at the second grating member 42.

Thus, the sample beam 48 is aligned to intersect the field of view 38 of the star tracker 32. In the preferred embodiment, the optical axis of the sample beam 48 intersects the optical axis of the field of view 38, and the second grating member 42 is at the intersection of the optical axes.

The sample beam 48 is diffracted by the operation of a grating at the surface 46 of the second grating member 42. Because the grating member has a low diffraction efficiency, only a minor portion of the intensity of the sample beam 48 is directed toward the star tracker 32. This minor portion is identified in FIGS. 1 and 2 as an attenuated sample beam 50. The attenuated sample beam is treated in the same manner as optical signals from the field of view 38, so that the scanning process of the star tracker 32 identifies the position of the attenuated sample beam relative to the imaged celestial bodies. A stellar map is acquired during the scanning process, with the intensity and positional data being output to the on-board computer 24, as indicated by connection line 52.

For applications in which the spacecraft 10 has a mission of acquiring altimetry data for determining ocean height using nadir-directed pulses, the output beam 16 from the source 12 is directed to an ocean location. Photons of backscattered energy are received at the reflection receiver 22. The round-trip pulse time is used to calculate the distance between the spacecraft and the surface of the earth 18. The position of the spacecraft relative to the center of the earth may be determined using GPS signals that are received from multiple sources by the GPS receiver 26. The precise location of the footprint 20 on the earth's surface may be determined using the grating rhomb 30 and the star tracker 32. Line-of-sight vectors may be calculated for determining the position of the attenuated sample beam 50 relative to known positions of the imaged stars. Because the beam path of the output beam 16 is in a direction opposite to the field of view 38 of the star tracker, the on-board computer 24 can reliably determine the position of the footprint 20 on the earth's surface.

An advantage of the invention is that the addition of the grating rhomb 30 adds little mass to the spacecraft, but provides a reliable means of determining footprint position. The optical paths of the output beam 16 and the attenuated sample beam 50 are parallel and have the same direction, with little or no effect if the wavelength of the output beam should vary. Moreover, the true centroid of the output beam is represented at the star tracker 32. The beam center is preserved at each of the diffractions by the first and second grating members 40 and 42. Consequently, a defocusing of the output beam will not adversely affect performance of the star tracker in determining the position of the output beam 16 relative to the imaged stellar map.

Referring now to FIGS. 2 and 3, the system preferably includes an auto-collimator 52 that monitors the orientation of the first and second grating members 40 and 42. The surfaces of the grating members are preferably parallel. However, temperature changes during a mission may cause some misalignment. Another cause of misalignment is the unequal exertion of forces on different components during a launch or during a release of a satellite from a launch vehicle. The configuration of the auto-collimator is not critical to the invention. In the embodiment of FIG. 3, the auto-collimator includes a transceiver 54, a beam splitter 56 and a v-shaped reflective member 58. The transceiver may be a laser generator and receiver. An outgoing reference beam 60 is generated by the transceiver and directed toward the beam splitter 56. The beam splitter may be designed to permit full passage of the outgoing reference beam through the beam splitter or the receiving portion of the transceiver may be aligned to not "see" energy that is reflected and then returned following multiple reflections. The relevant portion of the outgoing reference beam passes through the beam splitter 56 and strikes the v-shaped reflective member 58. The reflective member returns the beam to the beam splitter. A portion of that beam is reflected to the surface 46 of the second grating member 42. Energy is reflected at the second grating member and directed to the grating surface 44 of the first grating member 40. It follows that energy is reflected at the first grating member for return to the beam splitter 56, which directs an incoming reference beam 62 to the transceiver 54.

In FIG. 3, the surfaces of the first and second grating members 40 and 42 are not in a parallel relationship. This has been done to allow the beam to be fully illustrated in the drawing. Because the grating members are not parallel, the reference beams 60 and 62 will not be parallel. The misalignment of the reference beams will correspond to the misalignment of the grating surfaces 44 and 46. In the illustrated embodiment of the auto-collimator, the misalignment of the grating surfaces will be equal to fifty percent of the difference between the angles of the incoming and outgoing reference beams.

FIG. 4 illustrates a second embodiment of the invention. In this embodiment, the grating rhomb is formed of transmissive first and second grating members 64 and 66. A laser source 68 is directed to the first grating member 64, which allows propagation of a major portion of beam intensity along an optical path directly to a footprint 70 on the earth's surface. However, a minor portion of the output beam 72 is diffracted and forms a sample beam 74. The diffraction occurs as a result of placing a grating surface 76 in the orientation illustrated in FIG. 4. The geometry of the grating diffracts a minor portion ($10^{-3}$) of beam intensity toward the second transmissive grating member. The sample beam is further attenuated to form an optical signal that is input to a beam tracker 78, which may be identical to the one described above. The attenuated sample beam 80 is viewed as an optical signal in the same manner as light from the celestial bodies within the field of view 82 of the star tracker.

The operation of the embodiment of FIG. 4 is identical to the embodiment of FIG. 1. The only significant difference is that the sample beam 74 between the two grating members 64 and 66 does not have a directional component that is opposite to the direction of the output beam. In both of FIGS. 2 and 4, the attenuated sample beam 50 and 80 is spatially offset from the output beam 16 and 72, with the two beams having the same direction and the attenuated sample beam having a centroid which is representative of the centroid of the output beam.

I claim:

1. A system for precisely determining a direction of a beam comprising:
   a beam source positioned to direct an output beam along an optical path in a first direction;
   a body position identifier having a generally fixed optical line of sight in a second direction substantially opposite to said first direction, said body position identifier having a detector responsive to optical signals within a field of view of said body position identifier;
   a first grating member extending across said optical path of said output beam, said grating member having a geometry to diffract a minor portion of output beam intensity while passing a major portion of said output beam intensity for continued propagation in said first direction, said diffracted minor portion forming a sample beam; and
   a second grating member positioned within said field of view of said body position identifier and within a path of said sample beam, said second grating member being generally transparent to incoming optical signals incoming from a side of said second grating member opposite to said body position identifier, said second grating member having a geometry to diffract a portion of sample beam intensity to said detector of said body position identifier.

2. The system of claim 1 wherein said beam source is a laser source and said first and second grating members form a grating rhomb.

3. The system of claim 1 wherein said first grating member includes a first transparent substrate and a first surface layer having a first grating, said second grating member including a second transparent substrate and a second surface layer having a second grating.

4. The system of claim 3 wherein said first surface layer is on a side of said first transparent substrate proximate to said beam source and wherein said second surface layer is on a side of said second transparent substrate proximate to each of said first grating member and said body position identifier, whereby said sample beam energy which reaches said detector is beam energy reflected at each of said first and second grating members.

5. The system of claim 3 wherein said first surface layer is on a side of said first transparent substrate opposite to said beam source and wherein said second surface layer is on a side of said second transparent substrate opposite to each of said first grating member and said body position identifier, whereby said sample beam energy which reaches said detector is beam energy transmitted and redirected through each of said first and second gratings.

6. The system of claim 1 further comprising a spacecraft housing, each of said beam source, body position identifier and said first and second grating members being contained within said spacecraft housing.

7. The system of claim 6 wherein said body position identifier is a star tracker for forming a stellar map in response to said optical signals within said field of view, said line of sight of said star tracker being directed to image stars, said star tracker and said portion of said sample beam intensity that is diffracted to said detector having generally coincident optical axes.

8. The system of claim 7 further comprising a Global Positioning System (GPS) receiver fixed to said spacecraft housing, each of said GPS receiver and said detector of said star tracker having an input to a signal processor for determining the attitude of said spacecraft housing and the direction of said output beam.

9. The system of claim 1 further comprising an autocollimator means for monitoring the orientation of said first grating member to said second grating member.

10. A system for precisely determining a direction of a beam comprising:
    a star tracker having a first optical axis and a field of view and having a detector for forming star position data in response to light from celestial bodies within said field of view;
    beam source means for projecting an output beam having a second optical axis generally parallel to said first optical axis, said beam source means and said star tracker being directed in generally opposite directions;
    first grating means along said first optical axis for diffracting a minor portion of beam energy while allowing a major portion to propagate therethrough, said minor portion defining a sample beam, said first grating means having a grating geometry to direct said sample beam to intersect said field of view of said star tracker, said sample beam having a third optical axis;
    second grating means generally at an intersection of said sample beam and said field of view of said star tracker for diffracting a minor portion of beam energy of said sample beam toward said star tracker while allowing at least a major portion of light from said celestial bodies within said field of view to propagate therethrough, said minor portion defining an attenuated sample beam; and
    processing means for determining an orientation of said second optical axis of said output beam to said star position data.

11. The system of claim 10 further comprising a GPS receiver connected to said processing means for determining a position of said beam source means relative to earth.

12. The system of claim 10 wherein said first and second grating means define a grating rhomb which provides attenuation of said output beam by a factor within the range of 0.5 to $10^{-12}$.

13. The system of claim 10 wherein said second grating means is at an intersection of said third optical axis of said sample beam and said first optical axis of said star tracker.

14. The system of claim 10 wherein said first grating means traverses a beam path of said output beam and said second grating means traverses a beam path of said sample beam.

15. A system for precisely determining a direction of a laser beam for an altimeter determination comprising:

a laser source defining a beam path for an output beam;

imaging means for forming a map of a stellar region, said imaging means facing in a direction generally opposite to said beam path; and first and second grating members having generally parallel grating surfaces, said first grating member traversing said beam path and said second grating member traversing a field of view of said imaging means, said grating members being largely transmissive while diverting a portion of laser energy of said laser source, said grating members being oriented with respect to each other and said laser source and imaging means such that a sample portion of said laser energy from said laser source is diffracted and directed to said imaging means with a centroid of said sample portion being representative of a centroid of said output beam.

16. The system of claim 15 wherein said imaging means is a star tracker and each of said grating members is a low efficiency member with respect to diffracting said beam energy.

17. The system of claim 15 further comprising a GPS receiver and processing means connected to said GPS receiver for determining a position of said laser source in space.

18. The system of claim 15 further comprising an autocollimator for monitoring said parallel relationship of said first and second grating surfaces.

* * * * *